Patented Feb. 24, 1948

2,436,456

UNITED STATES PATENT OFFICE 2,436,456

HYDROCARBON RESIN-SULFURIZED OIL COMPOSITION

Frank J. Soday, Swarthmore, Pa., assignor to The United Gas Improvement Company, a corporation of Pennsylvania No Drawing. Application February 18, 1943, Serial No. 476,337

13 Claims. (Cl. 260—23)

This invention is concerned with the use of certain hydrocarbon resins in sulfurized oil compositions.

More particularly, this invention relates to compositions comprising one or more sulfurized oils and a resin or mixture of resins derived by the polymerization, by thermal and/or catalytic methods, of the high boiling monomeric hydrocarbon material separated in monomeric form from tar formed during the production of combustible gas by processes involving the pyrolytic decomposition of petroleum oil with or without the aid of catalysts.

A feature of the invention is the provision of compositions comprising one or more sulfurized oils in combination with one or more resins of the type described. Another feature of the invention is the incorporation of such compositions in natural and/or synthetic rubber compounds. Other objects and advantages of the invention will be apparent to those skilled in the art upon an inspection of the specification and claims.

The vulcanization, or addition of sulfur or sulfur-containing agents such as sulfur chloride, to fatty oils, particularly unsaturated fatty oils, results in the production of sulfurized oils ranging in properties from viscous liquid compositions to solid rubber-like bodies. In case sulfur halides, such as sulfur chloride, are employed as vulcanizing agents, the products obtained will contain both sulfur and chlorine.

The oils which may be used in the preparation of sulfurized oils of the type herein described comprise all of the unsaturated, or drying, fatty oils, certain semi-drying oils, and a limited number of non-drying oils. Examples of oils which have been found to be particularly desirable for the production of such sulfurized oils are linseed, tung, oiticica, perilla, soya bean, cottonseed, rapeseed, olive, castor, poppyseed, walnut seed corn, sandal seed, cod liver, and fish oils, as well as modifications of such oils, such as acetylated castor oil, blown linseed oil, bodied tung oil, and the like.

Although unmodified oils, such as linseed oil or soya bean oil, may be sulfurized to give products possessing desirable properties, the use of oils which have been bodied or polymerized, such as by the application of heat and/or catalysts is indicated in certain cases.

In general, unsaturated vegetable oils, such as linseed, soya bean, and cottonseed oils, are preferred for the preparation of sulfurized oils of the type more particularly described herein.

The vulcanizing agent employed may comprise sulfur or sulfur derivatives, such as sulfur chloride, thionyl chloride, sulfur dichloride, sulfur dioxide, and the like.

In general, the type of product obtained from a given oil depends both upon the type of sulfurizing agent employed and upon the proportion of sulfur or sulfur derivatives incorporated in the finished product. Two general types of products have found acceptance in the industry, namely, viscous liquid sulfurized oils and solid, rubber-like bodies. The liquid sulfurized oils generally contain a smaller proportion of combined sulfur than the solid, rubber-like products.

The liquid sulfurized oils are extensively used in the coating industry for the preparation of paints and varnishes, either alone or in combination with one or more drying oils, such as linseed or tung oils. Such compositions also may contain thinners, such as aromatic or petroleum solvents, and may contain other ingredients, such as pigments, driers, antioxidants, and the like.

The solid, rubber-like sulfurized oils, commonly referred to as factice, are extensively employed in the rubber industry as softening agents. Thus, the incorporation of factice in rubber compositions greatly assists in the milling, calendering, and/or extrusion of such compositions.

The most important type of factice employed as softening agents in natural and/or synthetic rubber compositions are white factice and brown factice.

White factice, which may range in color from water-white to yellow, commonly is prepared by the action of sulfur monochloride on the desired oil. The reaction is exothermic in nature and must be controlled within fairly narrow temperature limits to prevent charring. In the preparation of white factice, from 15 to 50 parts of sulfur monochloride may be combined with 100 parts of the desired oil. Thus, a satisfactory product is obtained by the reaction of 30 parts of sulfur chloride with 100 parts of linseed oil.

Brown factice may be prepared by the action of sulfur on the desired oil, or mixture of oils. The reaction is somewhat slower than when sulfur chloride is employed, and the mixture commonly must be heated before the desired reaction occurs. From 15 to 50 parts of sulfur may be combined with 100 parts of oil to prepare brown factice, the actual proportions employed in a given case depending largely upon the type of oil employed and the properties desired in the finished product. Brown factice may range in color from light brown to black.

The reaction between sulfur or sulfur derivatives and one or more drying or semi-drying oils, or derivatives thereof, may be carried out in any desired manner, although the reaction between sulfur and the desired oil or oils generally is carried out in the absence of solvents. The reaction between one or more oils and sulfur derivatives, such as sulfur monochloride, may be carried out in the presence of solvents, if desired.

In addition to its use in rubber compositions, factice also may be employed in the preparation of linoleum, mastic, and other floor coverings, as well as in molding compositions, such as those of the phenol-formaldehyde type.

The use of sulfurized oils in the industry, and particularly the use of factice in rubber compositions, has been retarded largely by certain inherent deficiencies in such materials, prominent among which may be mentioned their lack of tack, adhesion, and mechanical strength.

I have discovered that the field of utilization of sulfurized oils, and particularly factice, can be very largely increased, and their physical and mechanical properties largely improved, by the incorporation therein, either alone or in combination with other agents, of a resin derived by the polymerization, by thermal and/or catalytic methods, of the high boiling monomeric hydrocarbon material separated in monomeric form from tar formed during the production of combustible gas by processes involving the pyrolytic decomposition of petroleum oil with or without the aid of catalysts.

The improvement in the properties of sulfurized oils by the use of resins of the type described herein is directly traceable to certain outstanding physical properties possessed by these resins.

Resins of the type herein described may be produced with uniformity of quality by the controlled polymerization of unsaturated hydrocarbon fractions which may be closely controlled as to composition. At the same time by suitably selected variations in the polymerization procedure, resins possessing a wide range of physical properties may be reproducibly manufactured. Thus, for example, resins having melting points ranging from room temperature to 200° C., or higher, may be produced readily. This is of very considerable practical importance as it enables one to prepare sulfurized compositions having a wide variety of properties from the same type of resinous material. Thus, the use of resins having relatively low melting points will result in the production of sulfurized oil compositions possessing excellent tack and tack-imparting properties.

As these resins are substantially completely hydrocarbon in nature, and are substantially free from polar groups, sulfurized oil compositions prepared by their use are unusually stable and inert in nature, and are highly resistant to decomposition and deterioration in any way. In addition, these resins are derived from a distilled or extracted raw material, consequently they are free from dirt and other foreign material.

By a suitable control of the polymerizing process, and the method of isolating the unsaturated hydrocarbon material prior to polymerization, resins of the type described herein may be obtained readily in colors ranging from light yellow to dark brown. The use of such resins in the preparation of white factice compositions permits the production of fairly light colored products, which is of considerable practical importance.

Resins of the type described herein also are more completely compatible with sulfurized oils than many of the resins used heretofore for this purpose, consequently a wider range of formulations may be employed.

Probably the outstanding characteristics of these resins is their wetting and dispersing properties. This is of considerable value in the preparation of sulfurized oil compositions, as it results in a very considerable saving in the time and mechanical energy required to prepare such compositions.

The method of preparing these resins will be discussed in some detail in order to emphasize certain of their desirable properties.

I have discovered that the resin obtained by the thermal and/or catalytic polymerization of the unsaturated monomeric material boiling within the range of from 210° to 350° C. and separated in monomeric form from higher boiling pitch constituents of the tar formed during the production of gas by processes involving the pyrolytic decomposition of petroleum oil, with or without the aid of catalysts, is unusually well adapted for use in sulfurized oil compositions, producing products of exceptionally good properties.

In particular, the incorporation of such resins in sulfurized oil compositions, and particularly in factice, results in very largely improving the tack, adhesion, and mechanical strength of such materials. This is of very considerable practical importance from the standpoint of the utilization of such materials, and particularly the utilization of such compositions in certain synthetic rubber formulations, which are particularly deficient in tack and adhesive properties.

The hydrocarbon constituents of such petroleum tar have usually been considered to comprise residual tar, dead oil, and light oil. The residual tar comprises the heavy black pitch constituents of the tar together with any oil unseparated therefrom. The dead oil comprises oil separated from the residual tar and boiling higher than say 200–210° C. The light oil comprises oil separated from residual tar and boiling lower than, say 200–210° C.

It has been discovered that very considerable quantities of such resin-forming unsaturated monomeric material above referred to, including large quantities of readily heat polymerizable material, may be contained in the tar produced in the vapor phase pyrolysis of crude petroleum oil, or a fraction or fractions thereof, such as, for example, gas oil or residuum oil. This is particularly so in the case of petroleum oil gas tar produced when the pyrolysis is conducted at relatively high temperatures, such for example as in the manufacture of oil gas or carburetted water gas at average set temperatures above 1300° F. and at about atmospheric pressure and also particularly so when the oil pyrolyzed is naphthenic, such as a crude oil classifiable in classes 5 to 7 inclusive according to the method of classification described in Bureau of Mines Report of Investigations 3279, or a fraction or fractions of such an oil.

The possibility of recovering large quantities of resin forming monomeric unsaturated material boiling in the dead oil range was long unrealized. This was because the usual distillation procedures for the purpose of petroleum tar dehydration and/or tar fractionation were such as to polymerize the readily heat polymerizable monomers boiling in the dead oil range into heavy polymers, which were inextricably mixed with the heavy black residual pitch constituents and lost therein.

In copending application Serial Number 370,608, filed December 18, 1940, by Edwin L. Hall and Howard R. Batchelder, which has matured into Patent 2,387,259, granted Oct. 23, 1945, such heat polymerizable monomeric hydrocarbons boiling in the range of from 210 to 350° C. and separated from the heavy black pitch constituents of the petroleum tar are described and claimed, together with heat polymers produced therefrom.

In copending application Serial Number 386,232, filed April 1, 1941, by Waldo C. Ault, which has matured into Patent 2,387,237, granted Oct. 23, 1945, there is described and claimed the production of catalytic resins from the heat polymerizable and/or catalytically polymerizable monomeric hydrocarbons boiling within the range of from 210° C. to 350° C. and separated in monomeric form from the heavy black pitch constituents of the petroleum tar.

In the manufacture of oil gas and carburetted water gas, the tar produced is usually in the form of an emulsion due to the condensation of hydrocarbon constituents from the gas in the presence of water simultaneously condensed from the gas or otherwise present.

In copending application 342,735, filed June 27, 1940, by Edwin L. Hall and Howard R. Batchelder, which has matured into Patent 2,366,899 granted Jan. 9, 1945, there is described a method of dehydrating such petroleum tar emulsions and of fractionating the hydrocarbon constituents thereof by rapid distillation with the separation from the heavy pitch constituents of residual tar of such heat polymerizable unsaturated monomeric hydrocarbons boiling in the dead oil range.

In copending application 353,034, filed August 17, 1940, by Howard R. Batchelder, which has matured into Patent 2,383,362, granted Aug. 21, 1945, there is described the dehydration of such petroleum tar emulsions and the fractionation of the hydrocarbon constituents thereof with the recovery of monomeric unsaturated heat polymerizable dead oil constituents separate from the heavy black pitch constituents of residual tar, by the solvent extraction of the emulsion with a hydrocarbon solvent such as liquefied propane or butane.

Other processes, for example fractional condensation, might be employed to recover these relatively high boiling unsaturated hydrocarbons in monomeric form and separate from the heavy black pitch constituents of the tar. Also processes for oil pyrolysis which avoid the formation of emulsions, may be employed for the production of the monomeric material. Furthermore, while it may be preferred to employ petroleum oils or cuts therefrom, which are classifiable in classes 5 to 7, inclusive, according to Bureau of Mines Report of Investigations 3279 and particularly those in class 7, other oils may be employed.

Whatever process of oil pyrolysis is employed in the production of this monomeric material and whatever process is employed for separating the resultant tar, a very important factor is the exercise of care in the treatment of the tar in order to avoid excessive polymerization of these readily heat polymerizable dead oil constituents and their loss as polymers, mixed with the heavy black pitch constituents of the residual tar.

As a result of separation of the light oil and dead oil components of the products of such petroleum oil pyrolysis from the residual tar, without polymerization or with materially reduced polymerization, a substantially pitch-free hydrocarbon material may be separated having a portion boiling within the range of from 210 to 350° C., which may contain from 5% to 30%, and higher, of monomeric unsaturated hydrocarbons readily polymerizable by heat.

The particular concentration of this heat polymerizable monomeric material obtained in a given case will depend upon the amount of polymerization produced in separating it from the residual tar, as well as upon such factors as the conditions of pyrolysis and the character of the petroleum oil pyrolized.

As previously stated, the above mentioned heat polymerizable monomeric material may be readily polymerized by heat to form valuable resins.

Polymerization may be effected by heating the total material separated from the residual tar sufficiently to polymerize the readily heat polymerizable monomers boiling within the range of from 210° to 350° C., but insufficiently to appreciably polymerize the heat polymerizable material contained in lower boiling ranges, such, for instance, as methyl styrenes and styrene. This may be accomplished, for example, by heating with stirring for 4 hours at 200° C., followed by distillation under vacuum to isolate the resin.

It may be preferable, however, to first effect a separation by fractional distillation between light oil boiling below say 210° C. and dead oil boiling above say 210° C.

The heat polymerizable monomeric material boiling within the range of 210° to 350° C. is so readily polymerizable by heat, that, in the fractional distillation of the light oil from the dead oil, a portion of the monomeric material is usually unavoidably polymerized and remains as polymer dissolved in the other constituents of the dead oil after the light oil is taken off overhead.

The polymerization of the heat polymerizable unsaturated monomeric material in the separated dead oil may be effected by heating the dead oil with stirring, for example, for four hours at 200° C.

The resin thus produced, together with any resin produced during the separation of the light oil from the dead oil, may then be isolated by distillation under vacuum.

In the separation of lower boiling hydrocarbon material from the pitch constituents of residual tar by various methods, the oil separated may contain components boiling above 350° C. and there may be present heat polymerizable monomeric material boiling outside the range of from 210° and 350° C., together with the monomeric material boiling within that range. On polymerization, therefore, the resin may include polymers derived from monomers boiling outside the said range along with polymers derived from monomers boiling within the said range.

As hereinbefore stated, after polymerization the resin may be isolated by distillation in vacuum, which may be assisted by steam. The yield, melting point, and other characteristics of the resin will depend upon the extent to which the isolation has been carried, or, in other words, upon the proportion of associated oils left in the resin.

Exhaustive steam distillations of the resins obtained from the unsaturated monomeric material isolated from tar by the distillation or solvent extraction methods described herein have produced resins having melting points as high as from 185° C. to 200° C. and higher, cube in mercury, as determined by the method and apparatus described in A. S. T. M. Procedure D61-24, with the following modifications.

1. Mercury is employed in depth of 2½ inches instead of water.
2. The cube of resin is rigidly supported by clamping the hook upon which the resin is attached so that the top of the cube is 1 inch below the surface of the mercury.
3. A 1½ inch immersion thermometer is employed and is immersed to that depth.
4. The exact temperature at which the resin becomes visible at the surface of the mercury is recorded as the softening point of the resin.
5. The melting point of the resin is calculated from the softening point by the following formula.

Melting point °C. = softening point °C. ×1.25+2° C.

The melting point of the resins described in this specification is intended to mean melting point as determined by the above recited method, or by equivalent methods.

Lower melting point resins may be readily obtained in greater yields by less exhaustive removal of the associated oils, thus resins ranging from very soft to hard resins having high melting points may be obtained as desired.

It has been usually found that each 6% of associated oils left in the resin lowers the melting point about 10° C.

Heat resins having melting points of 120° C. have been readily produced in yields corresponding to 20 to 30% of the dead oil in the case of the tar distillate produced in accordance with the process described in copending application Serial No. 342,735, and resins of the same melting point have been obtained in yields as high as 60% of the dead oil in the case of dead oil separated from extract produced in the process described in application Serial No. 353,034.

The heat polymerizable unsaturated monomeric material is preferably in sufficient concentration in that portion of the hydrocarbon material separated from the residual tar which boils within the range of from 210° to 350° C. to produce on polymerization by heat a 120° C. melting-point resin in quantity equal to at least 10 percent of the hydrocarbon material boiling within the range from 210° C. to 350° C., and preferably at least 20 percent, or higher, but lower concentrations may be employed.

The color of the resins obtained may vary from yellow to dark brown.

Heat polymer resins produced from dead oil separated from residual tar by the distillation process described in said copending application, Serial No. 342,735, have shown a tendency to be lighter in color than those produced from dead oil obtained from the solvent extraction of tar with propane and butane as described in said copending application, Serial No. 353,034. Also, heat polymer resins produced from the lower boiling portions of the dead oil have shown a tendency to be lighter in color than heat polymer resins produced from the higher boiling portions, especially such a portion as that boiling in a dead oil cut taken from 180° C. to 210° C. under a vacuum equivalent to 20 mm. of mercury, absolute.

The following examples will serve to illustrate the preparation of resins from such unsaturated fractions by thermal polymerization methods.

*Example 1*

Approximately 1000 grams of dead oil derived from the rapid distillation of oil gas tar in accordance with the process described in said copending application Serial No. 342,735, and subsequent separation of the distillate, was weighed into a 2-liter 3-necked flask equipped with a thermometer and a short reflux condenser. The oil was then slowly stirred and heated over a Bunsen burner at a liquid temperature of 200° C. (±10° C.) for a period of 4 hours.

At the conclusion of this period, the material was allowed to cool somewhat and was then transferred for distillation to a tarred 2-liter flask equipped with a ground glass neck.

The oil was accurately weighed at this point.

The flask was provided with means for measuring vapor temperature and was connected with condensing apparatus and with means for providing a vacuum, including a pressure control device. Bumping during distillation was avoided by folding several folds of iron wire to such length that one end reached slightly into the neck of the flask while the other end rested on the bottom of the flask.

The pressure was reduced to 100 mm. Hg, absolute, and heat applied by means of a Bunsen burner. The distillation was continued at a pressure of 100 mm. Hg, absolute, until the vapor temperature reached 180° C. During this first stage of the distillation, care should be exercised to prevent crystallization of naphthalene, if present, such as by employing a condenser operating at elevated temperatures.

When the vapor temperature reached 180° C. at a pressure of 100 mm. Hg, absolute, the flame was lowered and the pressure gradually reduced to 20 mm. Hg, absolute, using care to avoid bumping. When a pressure equivalent to 20 mm. Hg, absolute, was reached, the pressure was maintained at that value, and the distillation continued until a vapor temperature of 195° C. was reached.

During the second stage, the condenser may be cooled by cold water, but care should be taken to avoid the solidification of anthracene, if present.

The distillation was conducted rapidly, 5 to 10 cc. of oil per minute being removed.

When a vapor temperature of 195° C. was reached, the source of heat was removed and air was permitted to enter the apparatus slowly until atmospheric balance was restored.

In the above operation the yield of resin was 29.3%, with an actual melting point of 128° C., which was calculated to be equivalent to a yield of 31.4% at a melting point of 120° C. The color of the resin was light brown.

A straight run A. S. T. M. distillation of 100 cc. of the original oil gave the following data:

| | | |
|---|---|---|
| First drop | degrees C. | 194 |
| 5 cc. | do | 212 |
| 10 cc. | do | 223 |
| 20 cc. | do | 234.5 |
| 30 cc. | do | 242.3 |
| 50 cc. | do | 256.5 |
| 70 cc. | do | 283.0 |
| 90 cc. | do | 319.0 |
| Decomposition point | do | 319.0 |
| Total distillate | cc. | 87 |
| Density at 20° C. | | 1.0107 |

As pointed out previously, the high boiling monomeric material derived from tar obtained in the pyrolysis of petroleum, by rapid distillation or solvent extraction methods may be polymerized to form resins of the type desired by the application of certain catalysts, either with or without the simultaneous, or otherwise, application of heat.

Catalysts such as mineral acids, for example, sulfuric acid, hydrogen chloride, acids of phosphorus, or acid acting metallic halides or complexes of said halides, preferably organic solvent complexes, as for example, boron trifluoride, aluminum chloride, boron trifluoride-diethyl ether complex, boron trifluoride-dimethyl ether complex, boron trifluoride-phenyl ether complex, boron trifluoride-phenyl methyl ether complex, boron trifluoride-dioxan complex, boron trifluoride-toluene complex, corresponding aluminum chloride complexes, and the like, may be employed for this purpose.

The metallic halides and their complexes employed are characterized by their ability to hydrolyze in the presence of water to give an acid reaction and, hence, for convenience they may be termed acid acting metallic halides.

Though acid-acting catalysts are preferred, other catalysts may be employed if desired, such, for example, as catalysts of the neutral surface type. Examples of such catalysts are activated clays, silica gel, activated carbon, and the like.

As an example of a convenient procedure for the production of resins of the type desired with the use of sulfuric acid as catalyst, the following is given.

*Example 2*

A sample of the oil to be polymerized, say 500 cc., is poured into a two-liter 3-neck flask equipped with a thermometer and stirrer. To the oil is added 96% $H_2SO_4$ while agitating vigorously. The acid is added 1 cc. at a time and the temperature is not permitted to exceed 50° C. The addition of the acid is continued in this manner until no further temperature rise is noted. The amount of acid necessary to achieve this end has been found to be about 1%, by volume, of the oil present.

The oil then is diluted with approximately an equal volume of naphtha, toluene, or similar diluent, and the solution decanted into 500 cc. of warm water (approximately 60° C.), leaving the acid sludge behind.

After settling, the water layer is drawn off, and neutralization of the acid is accomplished by use of a 10% to 20% aqueous solution of sodium hydroxide. After washing with caustic, an additional water wash may be made. In either case, the resin solution is dried by filtration through a bed of a suitable drying agent, such as lime.

If desired, the diluent may be added before polymerization instead of after polymerization.

After neutralization and drying, the resin may be isolated from the unpolymerized oil by any desired method, or the resin may be concentrated therein by vacuum distillation, which may be assisted by steam. The melting point of the resin and the yield obtained will depend, among other things, upon the extent to which the resin has been removed from the unpolymerized oil.

A convenient procedure for the production of resins of the type desired by the polymerization of monomeric unsaturated material, derived from tar resulting from the pyrolysis of petroleum, with the use of metallic halide catalysts or metallic halide-organic solvent complex catalysts is illustrated in the following examples.

*Example 3*

A 10 gram portion of the selected catalyst is suspended in 300 cc. of benzene by stirring. A 300 cc. portion of the dead oil separated from distillate recovered from petroleum tar emulsion by flash distillation as described in said copending application, Serial No. 342,735, is added dropwise from a separatory funnel while maintaining the temperature of the reaction mass below 50° C. When the addition has been completed, the mass is stirred for a period of 2 hours and then neutralized with an aqueous solution of sodium hydroxide (10 to 20%). Stirring is continued for an additional hour.

Clay or any other desired filter aid then is added and the mass is filtered. The aqueous layer is separated and discarded, after which the treated material is washed with hot water until the washings are neutral to litmus. The treated material then is filtered through lime to remove water or otherwise dried, and the resin isolated by any desired method.

The unsaturated dead oil employed in the following example was extracted from petroleum tar emulsion, along with light oil, following the procedure described in copending application Serial Number 353,034. After separation of the light oil, the unsaturated dead oil was treated in the following manner.

*Example 4*

A 532.6 gram portion of this unsaturated dead oil was treated with 8 cc. of 66° Bé. $H_2SO_4$ according to the procedure described in Example 2. Toluene was added after polymerization. Approximately 42% of the dead oil was converted to resin having a melting point of 97° C. and a brown color. The end temperature of the distillation for the removal of oil from the resin was 192° C. and the end pressure was equivalent to 18 mm. of mercury, absolute. A total of 145.9 grams of oil was recovered. The calculated yield of resin having a melting point of 120° C. was 36.2%.

As pointed out previously, the unsaturated dead oil employed for the preparation of resins of the type desired may be polymerized by (a) thermal means, (b) catalytic means, or (c) a combination of thermal and catalytic means. In the latter case, the processes may be carried out simultaneously or consecutively without the intermediate removal of resin, or the resin may be removed between successive treatments, or otherwise.

The unsaturated dead oil used in the following example was obtained from petroleum tar emulsion by the process of copending application Serial Number 342,735. After separation from light oil, it was treated to remove heat polymerizable unsaturates by heating at 200° C. for 4 hours, followed by removal of the heat polymer resin formed. It was then subjected to catalytic polymerization by the following method.

*Example 5*

A 500 gram portion of the said unsaturated dead oil was treated with 6 cc. of 66° Bé. $H_2SO_4$ according to the method described in Example 2. Naphtha was added after polymerization. Approximately 19% of the dead oil was converted to resin having a melting point of 88.2° C. and a light yellow brown color. The end temperature of the distillation for the removal of oil from the resin was 185° C., and the end pressure was equivalent to 20 mm. of mercury, absolute. A total of 407.9 grams of oil was recovered. The calculated yield of resin having a melting point of 120° C. was approximately 15%.

Examination of the monomeric unsaturated material and associated oil boiling within the range of from 210 to 350° C. described herein and the resins produced therefrom have shown that these materials are predominately aromatic.

Density determinations have indicated that the density at 25° C. of the resins was obtained as above described frequently falls within the approximate range of 1.12 to 1.20, with resins produced from dead oil from the solvent extraction or tar tending to be somewhat higher than those produced from dead oil from rapid tar distillation. The densities of the acid polymers tend to be somewhat lower than those of the heat polymers derived from the same unsaturated dead oil. Resins of this type having other densities may be employed, however.

The molecular weights of the resins produced as previously described necessarily vary with the melting point, which also varies with the presence of varying quantities of associated oil among other factors. Determinations by the Benzene Freezing Point Depression method have shown that such resins usually have molecular weights ranging from 308 to 758 over a range of melting points from 80.5° C. to 195° C. as determined by the cube in mercury method.

The fracture of the high melting point resins described herein may range from conchoidal to hackly. In general, the polymers are quite brittle.

The resins described herein, except those hardened by exhaustive steam distillation to a very high melting point, will usually react positively to the anthraquinone reaction, indicating the presence of anthracene, unless produced from lower boiling portions of the dead oil, which do not contain anthracene, or unless the anthracene has been otherwise removed.

The resins described herein usually will give but a slight diazo reaction, indicating the substantial absence of phenols.

The resins produced as above described usually will give negative Lieberman Storch reactions, indicating the absence of rosin acids.

Upon thermal decomposition of the resins of the type produced as above described herein, appreciable yields of material boiling within the range from 210° C. to 350° C. will be produced.

The heat polymer resins of the type produced as above described usually are substantially completely soluble in carbon disulfide and benzol.

The quantity of resin insoluble in a mixture containing 50% petroleum ether and 50% pentane varies with the melting point of the resin, and may be of the order of 52% in the case of a thermal resin having a melting point of 95° C. and of the order of 80% in the case of a thermal resin having a melting point of approximately 183° C.

The quantity of resin of the type produced as above described insoluble in a mixture of 50% petroleum ether and 50% pentane, but soluble in $CCl_4$, may be of the order of 50% for a thermal resin having a melting point of 95° C. and of the order of 74% in the case of a thermal resin having a melting point of 183° C.

The quantity of thermal resin insoluble in both the petroleum ether-pentane solution and $CCl_4$ usually is very low, ranging from a fraction of a percent to the neighborhood of 6 or 7%.

In general, catalytic polymers are much more soluble than heat polymers from the same unsaturated dead oil in all solvents except the alcohols.

The polymers from unsaturated dead oils obtained from the rapid distillation process described in copending application, Serial No. 342,735, tend to be more soluble in those solvents tried than similarly produced polymers from unsaturated dead oils obtained by the solvent extraction process described in copending application, Serial No. 353,034.

The above described characteristics of color, density, fracture, melting point, molecular weight, diazo reaction, Lieberman Storch reaction, anthraquinone reaction, thermal decomposition, and solubility are given for the purpose of illustration. It is not intended to imply necessarily that the resin produced as described above and employed herein may not depart somewhat from this illustrative description in one particular or more.

Furthermore, the addition of other materials to the heat polymerizable monomeric unsaturated materials prior to polymerization or to the resins after polymerization may of course modify the properties of the resins produced. Examples of such materials are other synthetic or natural resins, plasticizers, softeners, fillers, coloring materials, etc.

The resin employed may comprise mixed polymers of monomeric material boiling throughout the range of from 210° C. to 350° C. together if desired with polymers of monomers boiling outside of this range or resins may be employed which are produced from monomers boiling within a selected range or ranges within the range of from 210° C. to 350° C., for instance from separated material boiling above say 250° C. or say above 280° C., or from fractions boiling in the range of from 210 to 250° C., or 280° C., or otherwise.

The extracted oils may, for example, be distilled prior to polymerization to give a high boiling fraction and a low boiling fraction, which may be polymerized separately. In general, it has been found that the resins obtained from the low boiling fraction, that is, the oils boiling below, say 300–325° C., or even lower, usually are substantially lighter in color than the corresponding resins obtained from the high-boiling fraction. The use of such light colored resins may be preferred for certain of the applications disclosed herein.

In separating such material, the dead oil containing the monomers may be fractionated by distillation under vacuum assisted by steam to avoid undue polymerization during the separation, or other method of separation may be employed.

As previously pointed out, the herein described resins, namely, those obtained by the thermal and/or catalytic polymerization of the unsaturated monomeric material recovered from the tar formed during the production of gas by processes involving the pyrolytic decomposition or conversion of hydrocarbon oil, with or without the aid of catalysts, are unusually well adapted for use in modifying the properties of sulfurized oils.

The proportion of such resins which may be incorporated in sulfurized oils may be varied over a very wide range depending, among other things, upon the melting point of the resin, the physical properties of the sulfurized oil, and the properties desired in the resulting composition. In general, however, I prefer to employ compositions containing at least 10% of either component. Thus, compositions containing 10% sulfurized oil and 90% resin of the type described herein, as well as those containing 10% resin of the type described herein and 90% sulfurized oil, possess properties which render them particularly desirable for use in a number of commercial applications, such as in coating compositions, linoleum and mastic, and in rubber, and particularly synthetic rubber, compositions.

Particularly desirable results are obtained in many cases by the use of sulfurized oil formulations containing at least 20% resin of the type described herein.

The resin may be incorporated in the sulfurized oil in any desired manner, such as by working on suitable rolls, or mixing in a suitable mill, such as a Banbury mill, or otherwise. The resin also may be incorporated in the oil, or mixture of oils, prior to reaction with sulfur or a sulfur-containing compound, if desired.

As previously pointed out, sulfurized oils modified by the incorporation therein of resins obtained by the thermal and/or catalytic polymerization of the unsaturated monomeric material recovered from the tar formed during the production of gas by processes involving the pyrolytic decomposition or conversion of hydrocarbon oil, with or without the aid of catalysts, are unusually well adapted for blending with rubber, and particularly with synthetic rubbers or elastomers, to give compositions possessing exceptionally good properties. As blending agents for synthetic rubbers or elastomers, they enhance, rather than detract from, the physical properties of such materials in many cases.

Probably the outstanding improvement effected by the incorporation of my sulfurized oil-resin compositions in synthetic rubber formulations is the improvement in their tack and adhesive properties. These effects are particularly pronounced when factice modified with at least 20%, and more particularly 30%, of a resin of the type described herein is employed.

Examples of the rubber or rubber-like materials with which these sulfurized oil-resin blends may be compounded are the various grades and types of natural rubber and rubber-like materials, and synthetic rubbers or elastomers, such as, for example, those obtained by the polymerization of one or more diolefines, or substituents thereof, such as butadiene, isoprene, piperylene, 2-chlorobutadiene, and the like, either alone, or in admixture, or in combination with one or more unsaturated and/or reactive compounds or materials such as olefines, unsaturated nitriles, acids, esters, ethers, ketones, aldehydes, and/or substituents thereof, such as, for example, styrene, acrylic nitrile, isobutylene, acrylic esters, and the like. Important examples of synthetic rubbers or elastomers are those obtained by the copolymerization of one or more diolefines with (1) acrylic nitrile, (2) styrene or substituents thereof, and/or (3) isobutylene or similar olefines.

The quantity of sulfurized oil-resin composition of the type described herein which may be incorporated in natural or synthetic rubbers, or elastomers, may be varied over very wide limits, depending upon the properties desired. Thus, for example, quantities varying from a few percent, or less, to an amount equal to, or greater than, the quantity of rubber, or rubber mixture, employed in the composition, may be used.

In general, however, I prefer to incorporate not more than 50%, and more particularly not more than 30%, by weight of such sulfurized oil-resin blend in natural and/or synthetic rubber compositions, based on the weight of the rubber present in the said composition.

In addition to sulfurized oil-resin blends of the type described herein, other ingredients which may be incorporated in natural rubber and/or synthetic rubber compositions include vulcanizing agents and/or accelerators, such as, for example, sulfur or sulfur-containing compounds such as tetramethylthiuram disulfide, mercaptoarylenethiazoles, and dithio carbamates, metallic oxides, such as, for example, magnesium oxide, zinc oxide, and lead oxide, antioxidants, such as, for example, phenyl-alpha-naphthylamine, and phenyl-beta-naphthylamine, reinforcing pigments, such as, for example, carbon blacks, clay, and blanc fixe, fillers and/or diluents, such as, for example, lithopone, barytes, asbestine, and glue, softeners, such as, for example, paraffin wax, oils, fatty acids, and other synthetic or natural resins and/or deodorants, such as terpene compounds.

Reclaimed rubber is also included among the materials which may be blended with the sulfurized oil-resin blends herein described, together with natural and/or synthetic rubber and with or without other ingredients.

The sulfurized oil-resin blend, and other ingredients, may be mixed or compounded with the natural rubber and/or synthetic rubber on mixing rolls, or they may be compounded by any other method known in the art. The rubber composition then may be vulcanized, if desired, by any of the methods employed for this purpose in the art.

The invention may be more particularly described by means of the following examples.

Example 6

A mixture of 20 parts of resin of the type obtained in Example 1 is thoroughly blended with 80 parts of brown factice on a roll mill. The tack, adhesion, and mechanical strength of the factice is greatly improved.

Example 7

A mixture of 50 parts of a resin of the type obtained in Example 1 and 50 parts of a liquid sulfurized oil is blended with equal parts of bodied linseed oil. Upon diluting with an equal volume of mineral spirits, and adding small quantities of a drier, a very satisfactory coating composition is obtained.

Example 8

A mixture of 50 parts of a resin of the type obtained in Example 1, 50 parts of a sulfurized bodied linseed oil, and 50 parts of hardened linseed oil is thoroughly blended with an equal quantity of ground cork and applied to a burlap surface. A satisfactory floor covering is obtained.

Example 9

| Component | Parts by weight |
| --- | --- |
| Butadiene-acrylic nitrile copolymer rubber | 100.0 |
| Sulfurized oil-resin blend | 40.0 |
| Zinc oxide | 5.0 |
| Benzothiazyl disulfide | 1.5 |
| Sulfur | 1.5 |
| Phenyl beta naphthylamine | 1.0 |
| Channel black | 50.0 |
| Stearic acid | 0.5 |

Example 10

| Component | Parts by weight |
| --- | --- |
| Natural rubber | 100.0 |
| Sulfurized oil-resin blend | 20.0 |
| Zinc oxide | 5.0 |
| Sulfur | 2.5 |
| Mercaptobenzothiazole | 0.8 |
| Channel black | 10.0 |

Example 11

| Component | Parts by weight |
| --- | --- |
| Butadiene-styrene rubber | 100.0 |
| Sulfurized oil-resin blend | 5.0 |
| Carbon black | 35.0 |
| Sulfur | 3.0 |
| Mercaptobenzothiazole | 0.8 |
| Zinc oxide | 10.0 |
| Phenyl α-naphthylamine | 2.0 |

Example 12

| Component | Parts by weight |
| --- | --- |
| Neoprene | 100.0 |
| Sulfurized oil-resin blend | 5.0 |
| Magnesia | 10.0 |
| Carbon black | 35.0 |
| Pine tar | 3.0 |
| Phenyl α-naphthylamine | 2.0 |
| Sulfur | 1.0 |
| Zinc oxide | 5.0 |

Example 13

| Component | Parts by weight |
| --- | --- |
| Isobutylene-butadiene rubber | 100.0 |
| Sulfurized oil-resin blend | 10.0 |
| Carbon black | 15.0 |
| Sulfur | 1.0 |
| Mercaptobenzothiazole | 0.5 |
| Phenyl α-naphthylamine | 1.0 |
| Zinc oxide | 5.0 |

The foregoing compositions may be sheeted out, shaped and vulcanized, such as by the application of a temperature of say 140° C. in a press for a period of say 45 minutes. Other procedures may, of course, be used if desired.

To summarize, the present invention may be said to reside more completely in the provision of improved sulfurized oil-resin compositions, the said resin being obtained by the polymerization of the monomeric material recovered from tar and boiling above 210° C., and in the utilization of such compositions in the preparation of coating compositions, linoleum and mastic, and in natural and/or synthetic rubber compositions.

In the specification and in the claims, the term "sulfurized oils," or modifications thereof, is intended to mean oils modified by the incorporation of sulfur therein, either alone or in combination with other ingredients, such as halides.

While various procedures and formulas have been particularly described these are of course subject to considerable variation. Therefore, it will be understood that the foregoing specific examples are given my way of illustration, and that changes, omissions, additions, substitutions and/or modifications might be made within the scope of the claims without departing from the spirit of the invention, which is intended to be limited only as required by the prior art.

I claim:

1. A composition of matter comprising a mixture of from 10 to 90% of a sulfurized oil with from 90 to 10% of a resin resulting from the polymerization of hydrocarbons contained in a hydrocarbon oil which has been physically separated from tar produced in the vapor phase pyrolysis of petroleum oil and which hydrocarbon oil is free from and of greater volatility than the pitch of said tar, said hydrocarbons boiling between 210° C. and 350° C. and being polymerizable by the addition to said hydrocarbon oil of a catalyst and being also polymerizable by the application to said hydrocarbon oil of heat alone and being present in said hydrocarbon oil in amount greater than 5% of the total hydrocarbon oil boiling between 210° C. and 350° C.

2. A composition of matter comprising a mixture of from 10 to 90% of a sulfurized unsaturated vegetable oil with from 90 to 10% of a resin resulting from the heat polymerization of hydrocarbons contained in a hydrocarbon oil which has been physically separated from tar produced in the vapor phase pyrolysis of petroleum oil and which hydrocarbon oil is free from and of greater volatility than the pitch of said tar, said hydrocarbons boiling between 210° C. and 350° C. and being polymerizable by the addition to said hydrocarbon oil of a catalyst and being also polymerizable by the application to said hydrocarbon oil of heat alone and being present in said hydrocarbon oil in amount greater than 5% of the total hydrocarbon oil boiling between 210° C. and 350° C.

3. A composition of matter comprising a mixture of from 10 to 90% of a sulfurized unsaturated vegetable oil with from 90 to 10% of a resin resulting from the catalytic polymerization of hydrocarbons contained in a hydrocarbon oil which has been physically separated from tar produced in the vapor phase pyrolysis of petroleum oil and which hydrocarbon oil is free from and of greater volatility than the pitch of said tar, said hydrocarbons boiling between 210° C. and 350° C. and being polymerizable by the addition to said hydrocarbon oil of a catalyst and being also polymerizable by the application to said hydrocarbon oil of heat alone and being present in said hydrocarbon oil in amount greater than 5% of the total hydrocarbon oil boiling between 210° C. and 350° C.

4. A composition of matter comprising a mixture of from 10 to 90% of a sulfurized fatty oil with from 90 to 10% of a resin resulting from the polymerization of hydrocarbons contained in a hydrocarbon oil which has been physically separated from tar produced in the vapor phase pyrolysis of petroleum oil and which hydrocarbon oil is free from and of greater volatility than the pitch of said tar, said hydrocarbons boiling between 210° C. and 350° C. and being polymerizable by the addition to said hydrocarbon oil of a catalyst and being also polymerizable by the application to said hydrocarbon oil of heat alone and being present in said hydrocarbon oil in amount greater than 5% of the total hydrocarbon oil boiling between 210° C. and 350° C.

5. A composition of matter comprising a mixture of from 10 to 90% of a sulfurized unsaturated fatty oil with from 90 to 10% of a resin resulting from the polymerization of hydrocarbons contained in a hydrocarbon oil which has been physically separated from tar produced in the vapor phase pyrolysis of petroleum oil and which hydrocarbon oil is free from and of greater volatility than the pitch of said tar, said hydrocarbons boiling between 210° C. and 350° C. and being polymerizable by the addition to said hydrocarbon oil of a catalyst and being also polymerizable by the application to said hydrocarbon oil of heat alone and being present in said hydrocarbon oil in amount greater than 5% of the total hydrocarbon oil boiling between 210° C. and 350° C.

6. A composition of matter comprising a mixture of from 10 to 90% of a sulfurized soya bean oil with from 90 to 10% of a resin resulting from the polymerization of hydrocarbons contained in a hydrocarbon oil which has been physically separated from tar produced in the vapor phase pyrolysis of petroleum oil and which hydrocarbon oil is free from and of greater volatility than the pitch of said tar, said hydrocarbons boiling between 210° C. and 350° C. and being polymerizable by the addition to said hydrocarbon oil of a catalyst and being also polymerizable by the application to said hydrocarbon oil of heat alone and being present in said hydrocarbon oil in amount greater than 5% of the total hydrocarbon oil boiling between 210° C. and 350° C.

7. A rubber composition comprising a synthetic rubber resulting from the copolymerization of butadiene-1,3 with styrene, and a mixture containing sulfurized soya bean oil and a resin resulting from the polymerization of hydrocarbons contained in a hydrocarbon oil which has been physically separated from tar produced in the vapor phase pyrolysis of petroleum oil and which hydrocarbon oil is free from and of greater volatility than the pitch of said tar, said hydrocarbons boiling between 210° C. and 350° C. and being polymerizable by the addition to said hydrocarbon oil of a catalyst and being also polymerizable by the application to said hydrocarbon oil of heat alone and being present in said hydrocarbon oil in amount greater than 5% of the total hydrocarbon oil boiling between 210° C. and 350° C., said resin being present in said mixture in a proportion of at least 20% by weight of said sulfurized soya bean oil and not exceeding 90% by weight of said mixture, and said mixture being present in a proportion not exceeding 50% by weight of said synthetic rubber.

8. A rubber composition comprising a synthetic rubber resulting from the copolymerization of butadiene-1,3 with styrene, and a blend containing from 10 to 90% of sulfurized soya bean oil and from 90 to 10% of a resin resulting from the polymerization of hydrocarbons contained in a hydrocarbon oil which has been physically separated from tar produced in the vapor phase pyrolysis of petroleum oil and which hydrocarbon oil is free from and of greater volatility than the pitch of said tar, said hydrocarbons boiling between 210° C. and 350° C. and being polymerizable by the addition to said hydrocarbon oil of a catalyst and being also polymerizable by the application to said hydrocarbon oil of heat alone and being present in said hydrocarbon oil in amount greater than 5% of the total hydrocarbon oil boiling between 210° C. and 350° C., said blend being present in a proportion not exceeding 30% by weight of said synthetic rubber.

9. A rubber composition comprising a material selected from the group consisting of natural rubber and rubber-like polymers of butadiene 1,3, isoprene, piperylene and 2-chloro-butadiene 1-3, and a mixture containing from 10% to 90% sulfurized unsaturated vegetable oil and from 90% to 10% of a resin resulting from the polymerization of polymerizable hydrocarbons contained in a hydrocarbon oil which has been physically separated from tar produced in the vapor phase pyrolysis of petroleum oil and which hydrocarbon oil is free from and of greater volatility than the pitch of said tar, said hydrocarbon oil when separated and when subjected to polymerization containing in addition to hydrocarbons boiling between 210° C. and 350° C. which are not polymerizable by the application to said oil of heat alone but which are polymerizable to catalytic resin polymer by treating said oil with a resin-producing catalyst, other hydrocarbons boiling between 210° C. and 350° C. which are polymerizable to catalytic resin polymer by treating said oil with a resin-producing catalyst but which last-mentioned hydrocarbons are also polymerizable to heat resin polymer by the application to said oil of heat alone, said last-mentioned hydrocarbons being present in said hydrocarbon oil in amount greater than approximately 5% of the total hydrocarbon oil boiling between 210° C. and 350° C., said mixture being present in said rubber composition in a proportion not exceeding 50% by weight of said rubber.

10. A rubber composition comprising a material selected from the group consisting of natural rubber and rubber-like polymers of butadiene 1,3, isoprene, piperylene and 2-chloro-butadiene 1,3, and a mixture containing from 10% to 90% sulfurized soya bean oil and from 90% to 10% of a resin resulting from the polymerization of polymerizable hydrocarbons contained in a hydrocarbon oil which has been physically separated from tar produced in the vapor phase pyrolysis of petroleum oil and which hydrocarbon oil is free from and of greater volatility than the pitch of said tar, said hydrocarbon oil when separated and when subjected to polymerization containing in addition to hydrocarbons boiling between 210° C. and 350° C. which are not polymerizable by the application to said oil of heat alone but which are polymerizable to catalytic resin polymer by treating said oil with a resin-producing catalyst, other hydrocarbons boiling between 210° C. and 350° C. which are polymerizable to catalytic resin polymer by treating said oil with a resin-producing catalyst but which last-mentioned hydrocarbons are also polymerizable to heat resin polymer by the application to said oil of heat alone, said last-mentioned hydrocarbons being present in said hydrocarbon oil in amount greater than approximately 5% of the total hydrocarbon oil boiling between 210° C. and 350° C., said mixture being present in said rubber composition in a proportion not exceeding 50% by weight of said rubber.

11. A rubber composition comprising a synthetic rubber resulting from the copolymerization of butadiene with acrylic nitrile, and a mixture containing from 10% to 90% sulfurized soya bean oil and from 90% to 10% of a resin resulting from the polymerization of polymerizable hydrocarbons contained in a hydrocarbon oil which has been physically separated from tar produced in the vapor phase pyrolysis of petroleum oil and which hydrocarbon oil is free from and of greater volatility than the pitch of said tar, said hydrocarbon oil when separated and when subjected to polymerization containing in addition to hydrocarbons boiling between 210° C. and 350° C. which are not polymerizable by the application to said oil of heat alone but which are polymerizable to catalytic resin polymer by treating said oil with a resin-producing catalyst, other hydrocarbons boiling between 210° C. and 350° C. which are polymerizable to catalytic resin polymer by treating said oil with a resin-producing catalyst but which last-mentioned hydrocarbons are also polymerizable to heat resin polymer by the application to said oil of heat alone, said last-mentioned hydrocarbons being present in said hydrocarbon oil in amount greater than approximately 5% of the total hydrocarbon oil boiling between 210° C. and 350° C., said mixture being present in said rubber composition in a proportion not exceeding 50% by weight of said rubber.

12. A rubber composition comprising a synthetic rubber resulting from the copolymerization of butadiene with styrene, and a mixture containing from 10% to 90% sulfurized unsaturated vegetable oil and from 90% to 10% of a resin resulting from the polymerization of polymerizable hydrocarbons contained in a hydrocarbon oil which has been physically separated from tar produced in the vapor phase pyrolysis of petroleum oil and which hydrocarbon oil is free from and of greater volatility than the pitch of said tar, said hydrocarbon oil when separated and when subjected to polymerization containing in addition to hydrocarbons boiling between 210° C. and 350° C. which are not polymerizable by the application to said oil of heat alone but which are polymerizable to catalytic resin polymer by treating said oil with a resin-producing catalyst, other hydrocarbons boiling between 210° C. and 350° C. which are polymerizable to catalytic resin polymer by treating said oil with a resin-producing catalyst but which last-mentioned hydrocarbons are also polymerizable to heat resin polymer by the application to said oil of heat alone, said last-mentioned hydrocarbons being present in said hydrocarbon oil in amount greater than approximately 5% of the total hydrocarbon oil boiling between 210° C. and 350° C., said mixture being present in said rubber composition in a proportion not exceeding 50% by weight of said rubber.

13. A rubber composition comprising a synthetic rubber resulting from the copolymerization of butadiene with acrylic nitrile, and a mixture containing from 10% to 90% sulfurized unsaturated vegetable oil and from 90% to 10% of a resin resulting from the polymerization of polymerizable hydrocarbons contained in a hydrocarbon oil which has been physically separated from tar produced in the vapor phase pyrolysis of petroleum oil and which hydrocarbon oil is free from and of greater volatility than the pitch of said tar, said hydrocarbon oil when separated and when subjected to polymerization containing in addition to hydrocarbons boiling between 210° C. and 350° C. which are not polymerizable by the application to said oil of heat alone but which are polymerizable to catalytic resin polymer by treating said oil with a resin-producing catalyst, other hydrocarbons boiling between 210° C. and 350° C. which are polymerizable to catalytic resin polymer by treating said oil with a resin-producing catalyst but which last-mentioned hydrocarbons are also polymerizable to heat resin polymer by the application to said oil of heat alone, said last-mentioned hydrocarbons being present in said hydrocarbon oil in amount greater than approximately 5% of the total hydrocarbon oil boiling between 210° C. and 350° C., said mixture being present in said rubber composition in a proportion not exceeding 50% by weight of said rubber.

FRANK J. SODAY.

REFERENCES CITED

The following references are of record in the file of this patent:

UNITED STATES PATENTS

| Number | Name | Date |
|---|---|---|
| 1,769,506 | Gray | July 1, 1930 |
| 2,150,641 | Thomas et al. | Mar. 14, 1939 |
| 2,305,164 | Hubbard | Dec. 15, 1942 |